(12) United States Patent
Kellett et al.

(10) Patent No.: US 9,122,466 B1
(45) Date of Patent: Sep. 1, 2015

(54) POWER SYSTEM RECONFIGURATION WITH AUTOMATIC TRANSFER SWITCH

(71) Applicant: Amazon Technologies, Inc., Reno, NV (US)

(72) Inventors: Alan Noel Kellett, Drogheda (IE); Patrick Hughes, Cloncurry (IE); Jonathan David Hay, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 292 days.

(21) Appl. No.: 13/666,867

(22) Filed: Nov. 1, 2012

(51) Int. Cl.
*G06F 1/26* (2006.01)
*H02J 3/00* (2006.01)

(52) U.S. Cl.
CPC .. *G06F 1/26* (2013.01); *H02J 3/005* (2013.01)

(58) Field of Classification Search
CPC ...................................... H02J 7/00; H02J 9/00
See application file for complete search history.

(56) References Cited

U.S. PATENT DOCUMENTS

| | | | |
|---|---|---|---|
| 4,060,735 | A | 11/1977 | Pascucci et al. |
| 5,675,194 | A | 10/1997 | Domigan |
| 5,939,799 | A * | 8/1999 | Weinstein ........................ 307/64 |
| 6,008,971 | A | 12/1999 | Duba et al. |
| 6,992,247 | B2 | 1/2006 | Rasmussen et al. |
| 7,560,831 | B2 | 7/2009 | Whitted et al. |
| 2002/0135233 | A1 | 9/2002 | Cratty |
| 2007/0046103 | A1 | 3/2007 | Belady et al. |
| 2008/0018175 | A1 | 1/2008 | McNamara et al. |
| 2009/0314541 | A1 | 12/2009 | Jones et al. |
| 2010/0019574 | A1 * | 1/2010 | Baldassarre et al. ............ 307/23 |
| 2010/0141038 | A1 * | 6/2010 | Chapel et al. ................... 307/64 |
| 2010/0141040 | A1 * | 6/2010 | Chapel et al. ................... 307/80 |
| 2010/0235671 | A9 | 9/2010 | Jain |
| 2011/0198928 | A1 * | 8/2011 | Lee ................................ 307/39 |
| 2012/0074794 | A1 * | 3/2012 | Morales et al. ............... 307/147 |
| 2012/0181869 | A1 * | 7/2012 | Chapel et al. ................... 307/64 |
| 2012/0181872 | A1 * | 7/2012 | Lim et al. ....................... 307/70 |
| 2014/0111006 | A1 * | 4/2014 | Baldassarre et al. ............ 307/23 |

OTHER PUBLICATIONS

U.S. Appl. No. 12/892,750, filed Sep. 28, 2010, Osvaldo P. Morales.
U.S. Appl. No. 13/071,488, filed Mar. 24, 2011, Michael P. Czamara.
International Search Report and Written Opinion for PCT/US 11/51273, dated Jan. 26, 2012, Amazon Technologies, Inc., 11 pages.

* cited by examiner

*Primary Examiner* — Thomas Lee
*Assistant Examiner* — Chad Erdman
(74) *Attorney, Agent, or Firm* — Robert C. Kowert; Meyertons, Hood, Kivlin, Kowert & Goetzel, P.C.

(57) ABSTRACT

Reconfiguring a power system for an electrical load includes establishing a secondary feed to an electrical load that is receiving power from a primary power source. A set of secondary feed lines is coupled between a donor power source and a power input to the electrical load such that the set of secondary feed lines is configured to supply power from the donor power source to the electrical load. An automatic transfer switch is coupled in parallel with the set of secondary feed lines. The electrical load is transferred by the automatic transfer switch from the donor power source to the primary power source for the reconfiguration.

18 Claims, 12 Drawing Sheets

POWER SYSTEM RECONFIGURATION WITH AUTOMATIC TRANSFER SWITCH

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 110V). A network of cabling, bus bars, power connectors, and power distribution units, is used to deliver the power at the lower voltage to numerous specific components in the facility.

Primary power systems for computer systems in operation typically need to be maintained or reconfigured from time to time. Some data centers, for example, have "single threaded" distribution via the electrical power supply to the floor and/or to the rack, and in which maintenance can only be performed when the components using power in the data center, such as servers, are shut-off. The down-time associated with maintenance and reconfiguration of primary power systems in a data center may result in a significant loss in computing resources. In some critical systems such as hospital equipment and security systems, down-time may result in significant disruption and, in some cases, adversely affect health and safety.

For safety reasons, the electrical codes and regulations of some countries may require that a residual current device (such as a ground fault circuit interruption device) be included in circuits supplying power to electrical loads in a data center. In some situations, the residual current devices may trip in unintended ways that are not needed to ensure safety. For example, actions taken to reconfigure power to computing systems under live conditions (such as plugging in a secondary feed for the computing systems while a primary power source is active) may cause a residual current device to trip, causing an unintended and unnecessary loss of power to the computing systems.

Figure 1:
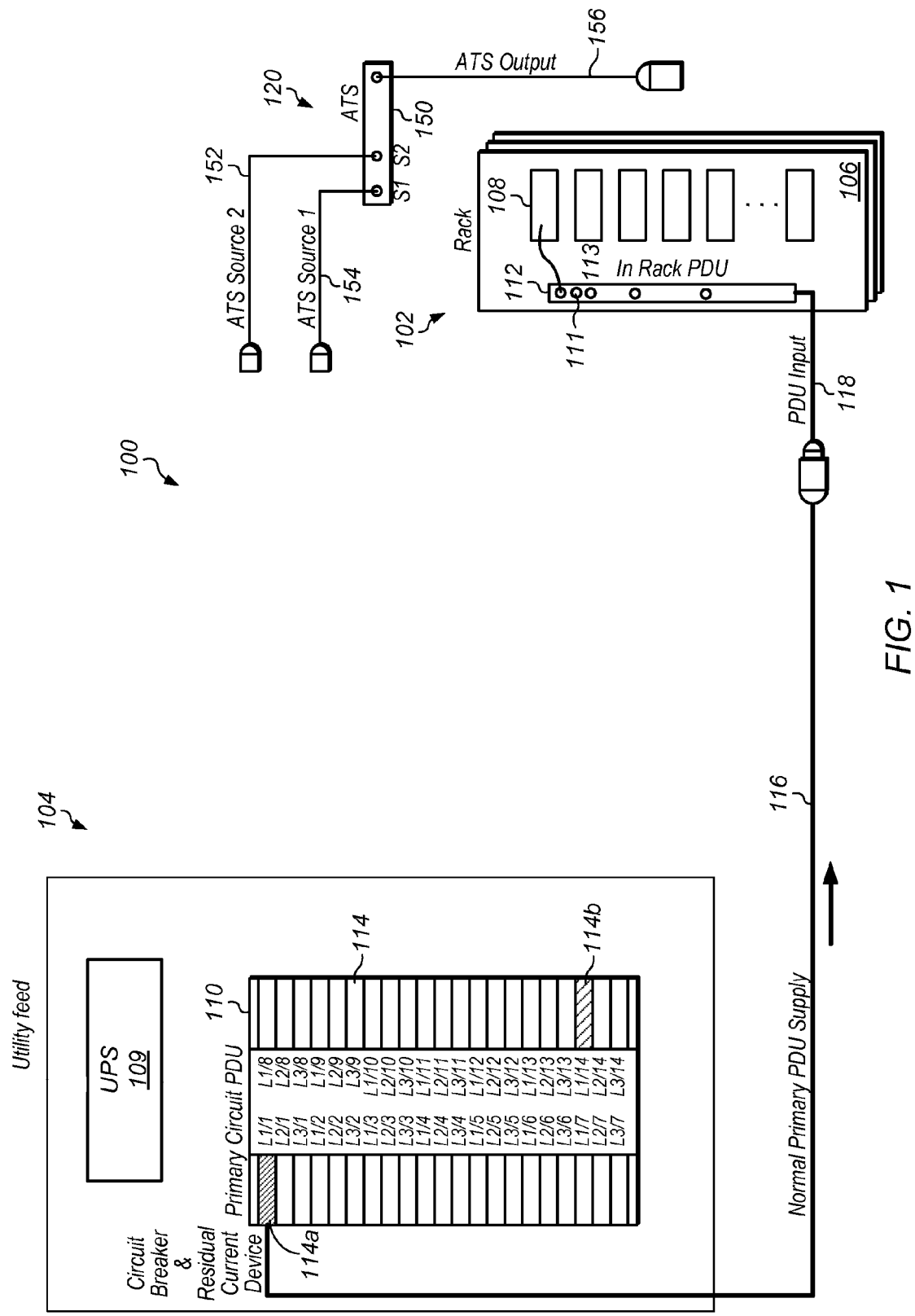
FIG. 1 illustrates a data center including rack systems that receive power from a primary power system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and systems for establishing feeds to electrical systems, such as computer systems in a data center, are disclosed. According to one embodiment, a method of reconfiguring a power system for computing devices in a rack includes establishing a back-feed to computing devices in a rack computing system that is receiving power from a primary power source. Establishing the back-feed includes coupling a set of back-feed lines from a donor power source to one or more output receptacles of a rack power distribution unit of the rack computing system such that the set of back-feed lines supplies power from the donor power source to the computing devices. An automatic transfer switch is coupled in parallel with the set of back-feed lines. An alternate source ATS input of the automatic transfer switch is coupled to the donor power source. An ATS output of the automatic transfer switch is coupled to a power input of the computing devices such that the computing devices receive power from the donor power source via the automatic transfer switch. The set of back-feed lines is disabled from the computing devices. A normal ATS input of the automatic transfer switch is coupled to a primary power source for the reconfiguration. The primary power source for the reconfiguration may be the same as the original primary power source (for example, where the reconfiguration is for cutting in an automatic transfer switch to an existing power system) or different from the original primary power source (for example, for migration from one primary power source to another). The computing devices are transferred by the automatic transfer switch from the donor power source to the primary power source for the reconfiguration.

According to one embodiment, a method of reconfiguring a power system for an electrical load includes establishing a secondary feed to an electrical load that is receiving power from a primary power source. Establishing the secondary feed includes coupling a set of secondary feed lines between a donor power source and a power input to the electrical load such that the set of secondary feed lines is configured to supply power from the donor power source to the electrical load. An automatic transfer switch is coupled in parallel with the set of secondary feed lines. An alternate source ATS input of the automatic transfer switch is coupled to the donor power source. An ATS output of the automatic transfer switch is coupled to the power input of the electrical load such that the electrical load receives power from the donor power source via the automatic transfer switch. The set of secondary feed lines is disabled from the electrical load. A normal source ATS input of the automatic transfer switch is coupled to a primary power source for the reconfiguration. The electrical load is transferred by the automatic transfer switch from the donor power source to the primary power source for the reconfiguration.

According to one embodiment, a system for reconfiguring a power system for electrical loads includes a secondary feed system and an automatic transfer switch. The secondary feed system includes a set of secondary feed lines that supply power from a donor power source to an electrical load and a feed-switching device that switches power through one or more of the secondary feed lines. The automatic transfer switch couples in parallel with the secondary feed lines.

As used herein, an "alternate source" means, in the context of an automatic transfer switch, a source that an automatic transfer switch can use to supply power to a load when normal conditions do not exist. For example, an automatic transfer switch may switch to an alternate source input when a normal source fails.

As used herein, a "cable" includes any cable, conduit, or line that carries one or more conductors and that is flexible over at least a portion of its length. A cable may include a connector portion, such as a plug, at one or more of its ends.

As used herein, "computer room" means a room of a building in which computer systems, such as rack-mounted servers, are operated.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc—read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, "floor power distribution unit" refers to a power distribution unit that can distribute electrical power to various components in a computer room. A power distribution unit may be housed in an enclosure, such as a cabinet.

As used herein, a "match", in the context of matching sets of power lines, means that the characteristics between the sets of power lines are similar to one another within acceptable limits. A match does not require that the measurements of the two items be precisely equal. In some embodiments, the acceptable variance levels for a match are predetermined. For example, in one embodiment, for a voltage level match, an input power line may be predetermined to match a feed line if the difference in measured voltage between the two lines is 7 volts or less. Various characteristics, such as voltage, waveform, etc. may be used as criteria to determine a match.

As used herein, a "normal source" means, in the context of an automatic transfer switch, a source that an automatic transfer switch can use to supply power to a load during normal conditions. Normal conditions may include, for example, conditions in which characteristics of the normal source are measured to be within acceptable limits for the load.

As used herein, "power distribution unit" means any device, module, component, or combination thereof, that can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.). A power distribution unit may include a transformer, power monitoring, fault detection, isolation.

As used herein, "primary power" means any power that can be supplied to an electrical load, for example, during normal operating conditions.

As used herein, "rack power distribution unit" refers to a power distribution unit that can be used to distribute electrical power to various components in a rack. A rack power distribution may include various components and elements, including wiring, bus bars, connectors, and circuit breakers.

As used herein, "remote power panel" means any panel, device, module, component, or combination thereof, that can be used to transfer or distribute electrical power from one or more input conductors to one or more output conductors. In certain embodiments, a remote power panel includes main lug only ("MLO") panel conductors. A remote power panel may be housed in an enclosure, such as a cabinet.

As used herein, "reserve power" means power that can be supplied to an electrical load upon the failure of, or as a substitute for, primary power to the load.

As used herein, a "secondary feed" refers to any feed that supplies power that is separate from a primary power system for at least a portion of a primary power chain.

As used herein, a "tertiary feed" refers to any feed that supplies power that is separate from two power systems (such as a primary power system and a reserve power system) for at least a portion of the two power system chains. In some embodiments, a secondary power feed or tertiary feed may be completely independent of the primary power distribution system. In some embodiments, however, a secondary feed or tertiary feed is not completely independent of the primary power distribution system. For example, both the primary power distribution system and a secondary feed may both receive power from the same utility feed, the same step-down transformer (for example, a primary-side transformer), the same uninterruptible power supply (for example, a primary-side), etc.

As used herein, "source power" includes power from any source, including but not limited to power received from a utility feed. In certain embodiments, "source power" may be received from the output of a transformer.

In some embodiments, a power feed is established to electrical systems while systems are live. Systems receiving power from an added feed may be of various types. Examples include hospital equipment, utility systems, security systems, military systems, telecommunications systems, or electronic commerce systems. In certain embodiments, an additional feed is provided to a critical system, such as a life support system. In some embodiments, the systems are computer systems in a data center. An additional power feed may allow the primary power system to be temporarily taken off-line for reconfiguration or maintenance of, for example, the primary power system. In some embodiments, the feed is accomplished by paralleling a primary power distribution system over a portion of a power distribution chain.

In some embodiments, reconfiguration or maintenance operations are performed under live conditions (for example, while maintaining servers in a powered up state and performing computing operations using the servers). In one embodiment, computer systems in a rack are maintained live while an automatic transfer switch is installed between a floor power distribution unit and a rack power distribution unit for the computer systems. The installed automatic transfer switch may be used, for example, to switch to a reserve power system. The installation may be carried out in a "live" environment in which the computer systems in the rack remain in operation.

In some embodiments, reconfiguring a power system for an electrical load under live conditions includes allowing an ATS to transfer the electrical load from a secondary feed to the primary power source for the reconfigured system. To set up the transfer, the ATS may first be connected in parallel with the secondary feed to the electrical load. For example, in one embodiment, the ATS is connected in parallel with a back-feed of the secondary power source to a rack PDU supplying power to rack-mounted computing devices in a computing room of a data center.

In some cases, a reconfiguration process is used to cut in an ATS so a back-up power source can be added to the system (the back-up power source may be provided on the alternate input of the ATS). In other cases, the reconfiguration process is used to migrate the computing devices from one primary power source to another primary power source.

FIGS. 1-8 illustrate cutting in a secondary power source using an automatic transfer switch to re-establish a primary power source for electrical systems operating in a data center. The data center may be equipped with a feed device that can feed power to electrical systems through a rack power distribution unit. In one embodiment, the feed device taps electrical power from a power source panel and feeds the power to a rack power distribution unit.

FIG. 1 illustrates a data center having rack systems that receive power from a primary power system. Data center 100 includes rack systems 102 and primary power system 104. Rack systems 102 include rack 106 and electrical systems 108. Electrical systems may include, for example, computer systems, rack-mounted servers, network control devices, power supply units, air moving devices, and mass storage devices. Primary power system 104 includes uninterruptible power supply 109 and floor power distribution unit 110.

In some embodiments, a transformer for each of the power systems is coupled to a utility feed. The utility feed may be a medium voltage feed. In certain embodiments, the utility feed is at a voltage of about 13.5 kilovolts or 12.8 kilovolts at a frequency of about 60 Hz. Generators may provide power to primary power system 104 in the event of a failure of utility power to the transformer. In one embodiment, one generator provides back-up power for each of two or more primary power systems. UPS 109 may provide uninterrupted power to rack-mounted electrical systems in the event of a power failure upstream from UPS 109. In certain embodiments, UPS 109 receives three-phase power from a transformer. UPS 109 may supply three-phase power to a floor power distribution unit.

Floor power distribution unit 110 may have any number of outputs for each phase combination. In some embodiments, a floor distribution unit may have one receptacle for each of the six phase combinations. In some embodiments, a floor distribution unit may have two or more receptacles for each of the six phase combinations. In some embodiments, a floor power distribution may have outputs for only some of the phase combinations (for example, AB, BC, and AC only). In certain embodiments, a floor distribution unit may receive and/or distribute two-phase power. In certain embodiments, a floor distribution unit may receive and/or distribute a single phase (for example, hot, neutral, and ground).

Rack systems 102 may be located in a computing room of data center 100. Electrical systems 108 may be coupled to an output receptacle 111 of rack power distribution unit 112 by way of cables 113. Each of rack power distribution units 112 may receive power from floor power distribution unit 110 by way of one of output panel devices 114. In operation of data center 100, any or all of rack PDU receptacles 111 may be used to supply power to electrical systems in rack system 102, such as servers.

In one embodiment, rack PDU receptacles 111 are IEC 60320 C13 receptacles. In one embodiment, rack PDU receptacles 111 are IEC 60320 C19 receptacles. In some embodiments, all of rack PDU receptacles 111 are wired in parallel with one another. In other embodiments, rack PDU receptacles 111 may be split into two or more banks of receptacles. The receptacles in each bank may be wired in parallel with one another. In some embodiments, one bank of receptacles is provided for each hot wire from the power source (one bank for A-neutral, another for B-neutral) or for each hot wire pairing from the power source (AB, BC, AC).

Each of rack power distribution units 112 may be coupled to the power output device 114 in floor power distribution unit 110 by way of primary power cable 116. Primary power cable 116 is coupled to PDU input cable 118 of rack power distribution unit 112. In the embodiment shown in FIG. 1, primary power cable 116 is coupled to power output device 114a. Power output device 114a includes a circuit breaker (for example, a miniature circuit breaker) and a residual current device ("RCD"). The circuit breaker of power output device 114a may trip based on overcurrent conditions from electrical loads connected to power output device 114a. The RCD of power output device 114a may trip as a result of an imbalance between lines connected to power output device 114a. (In each of FIGS. 1-8, power transmission for the illustrated connections is indicated by the arrows.)

Examples of residual current devices that may be used in a power distribution unit include residual-current circuit breaker ("RCCB") devices, residual current circuit breaker with overload protection ("RCBO") devices, appliance leakage current interrupter ("ALCI") devices, and ground fault circuit interruption ("GFCI") devices. In certain embodiments, a residual current device is used in combination with (for example, in series with) one or more circuit breakers.

Automatic transfer switch 120 is provided for establishing a reserve power source for electrical systems 108 of rack systems 102. Initially, automatic transfer switch 120 may be disconnected from rack systems 102.

Figure 2:
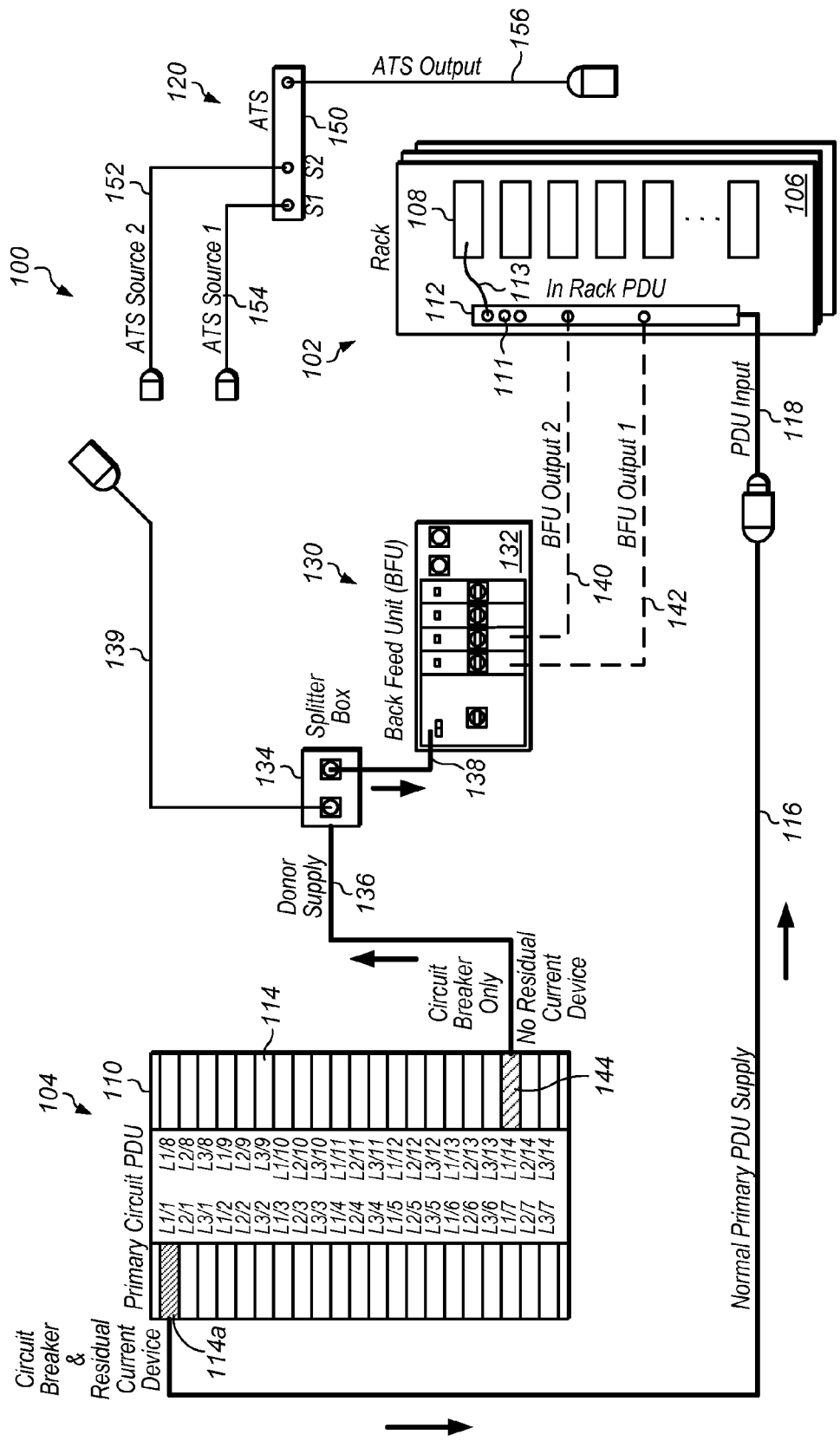
FIG. 2 illustrates connection of a back-feed system from a donor source in a floor power distribution unit to a rack power distribution unit that is supplying power to electrical systems in a rack.

FIG. 2 illustrates connection of a back-feed system from a donor source in a floor power distribution unit to a rack power distribution unit supplying power to electrical systems in a rack. Back feed system 130 may be used to provide a secondary power feed to rack systems 102. Back feed system 130 includes back feed unit 132, splitter box 134, donor supply cable 136, back feed unit input cable 138, splitter cable 139, and back feed unit output cables 140 and 142.

Donor supply cable 136 is coupled between floor power distribution unit 110 and splitter box 134. Back feed unit input cable 138 is coupled between splitter box 134 and back feed unit 132. Back feed unit output cables 140 and 142 are coupled between back feed unit 132 and output receptacles 111 of rack power distribution unit 112.

Donor supply cable 136 is connected to power output device 144. In this example, power output device 144 has a circuit breaker, but does not include a residual current device. In some embodiments, establishing the back-feed may include replacing a power output device that includes a residual current device with a power output device that does not include a residual current device. For example, power output device 114*b* in position L1/14 shown in FIG. 1 may include a circuit breaker and a residual current device. To establish a secondary feed to rack systems 102, power output device 114*b* may be replaced with a circuit breaker-only power output device 144.

Figure 3:
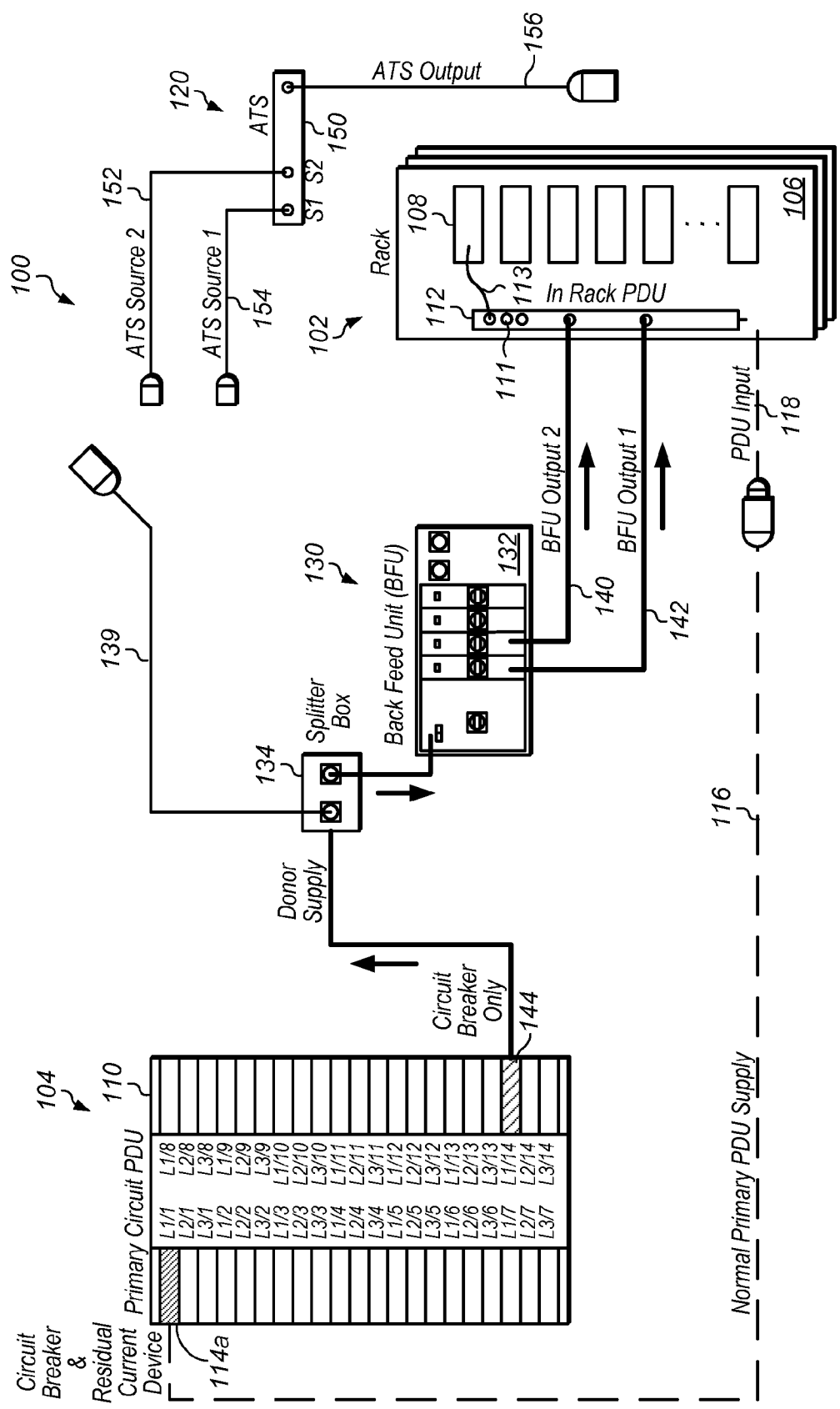
FIG. 3 illustrates a system in which a back feed has been established to a rack power distribution unit supplying power to electrical systems in a rack.

Once back feed system 130 is connected, a switch may be operated to establish a back feed. FIG. 3 illustrates a system in which a back feed has been established to a rack power distribution unit supplying power to electrical systems in a rack. In some cases, when the switch is closed in back feed unit 132 to establish the back feed, the residual current device in power output device 114*a* of floor power distribution unit 110 trips due to an imbalance in the primary power lines, resulting in the loss of the primary power feed to rack power distribution unit 110 (as indicated by the dashed lines in the primary power feed). Nevertheless, electrical systems 108 in rack systems 102 may remain powered up via the back feed from power output device 144 through back feed unit 132.

Figure 4:
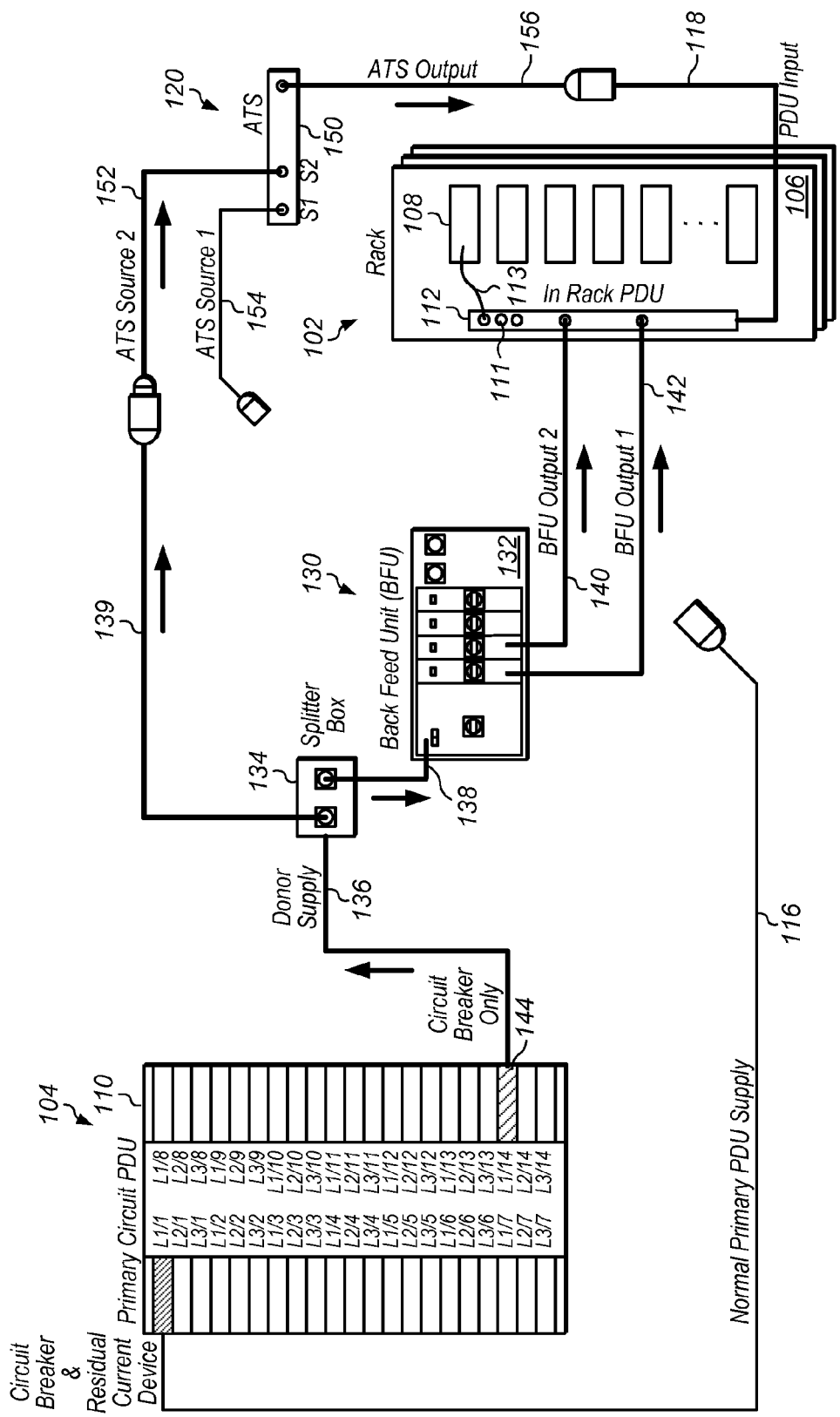
FIG. 4 illustrates an automatic transfer switch connected in parallel with a back-feed.

After the back-feed has been established to electrical systems 108, a parallel connection may be established between the back-feed and an automatic transfer switch. FIG. 4 illustrates an automatic transfer switch connected in parallel with a back-feed.

Automatic transfer switch 120 includes switching unit 150, alternate source input cable 152, normal source input cable 154, and ATS output cable 156. (In FIG. 4, the alternate power source input may be referred to as "ATS Source 2" and the normal power source input may be referred to as "ATS Source 1".) Alternate source input cable 152 is coupled to splitter cable 139. PDU input cable 118 is disconnected from primary power cable 116 and connected to ATS output cable 156. Splitter box 134 may split donor power from floor power distribution unit 110 between ATS back feed unit input cable 138 and automatic transfer switch 120. With this connection in place, electrical systems 108 in rack systems 102 may be supported by donor power through both back feed unit 132 and the alternate source-side of automatic transfer switch 120.

Figure 5:
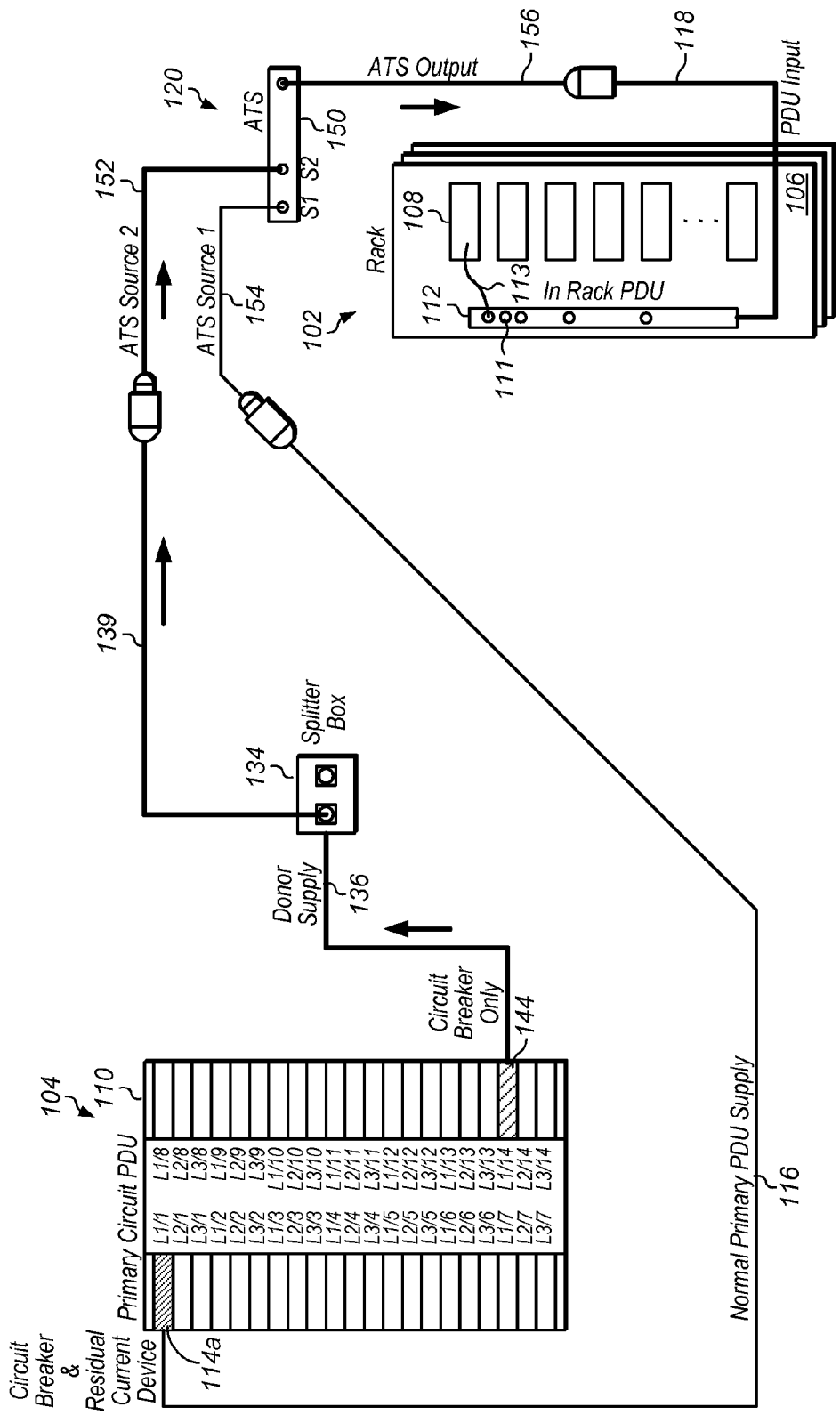
FIG. 5 illustrates a system with a system after removal of a back-feed unit and re-connection of cables of a primary power source.

With the electrical systems supported by both the back-feed system and the alternate source input to the automatic transfer switch, the back-feed unit may be removed from the system. The normal source input of the automatic transfer switch may be re-connected to the primary power source. FIG. 5 illustrates a system with a system after removal of a back-feed unit and re-connection of cables of a primary power source. Primary power cable 116 may be coupled to normal source input cable 154 of automatic transfer switch 120. At this stage, no power may be supplied to automatic transfer switch 120 from primary power cable 116 because power output device 114*a* on floor power distribution unit 112 may be in a disabled condition. For example, a residual current device of power output device 114*a* may still be in a tripped state from when the back-feed was established to rack power distribution unit 112.

Figure 6:
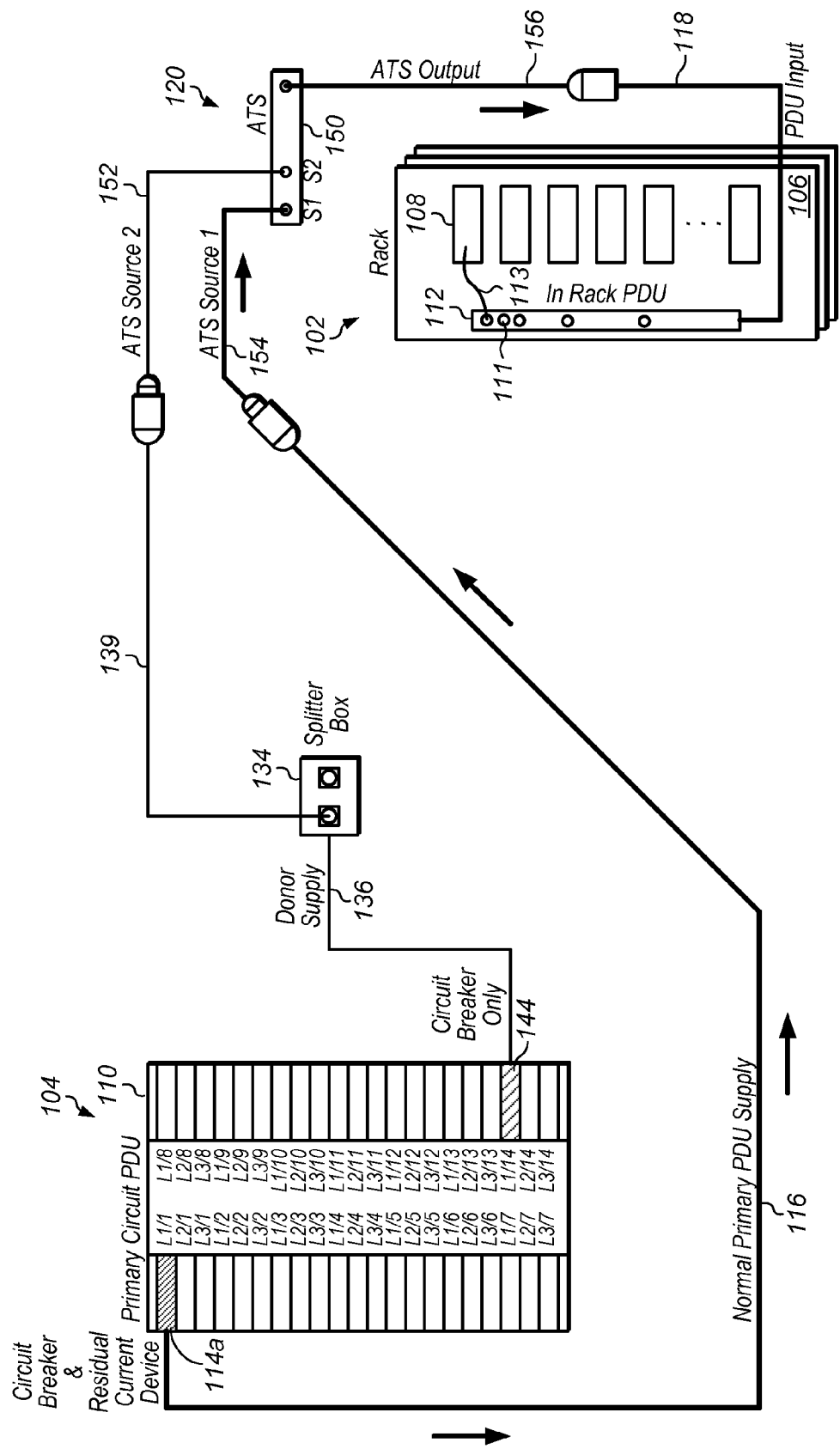
FIG. 6 illustrates a set of electrical systems with primary power energized on a normal input of an automatic transfer switch.

With the electrical systems supported by the alternate source input of the ATS and the normal source input of the ATS re-connected to the primary power source, the primary power source may be re-energized to the ATS normal input. FIG. 6 illustrates a set of electrical systems with primary power energized on an ATS normal input. Initially, when primary power cable 116 may be coupled to normal source input cable 154 of automatic transfer switch 120, automatic transfer switch 120 may remain on the alternate source input side. After power coming into automatic transfer switch 120 through normal source input cable 154 has been met predetermined criteria (for example, stable for a predetermined period of time), automatic transfer switch 120 may automatically switch to normal source input cable 154 such that power is supplied to electrical systems 108 from primary power transmitted through primary power cable 116. In one embodiment, power is automatically switched by automatic transfer switch 120 about 5 minutes after the primary power source is enabled. In some embodiments, primary power to normal source input cable 154 is established by resetting a residual current device in power output device 114*a* of floor power distribution unit 110.

Figure 7:
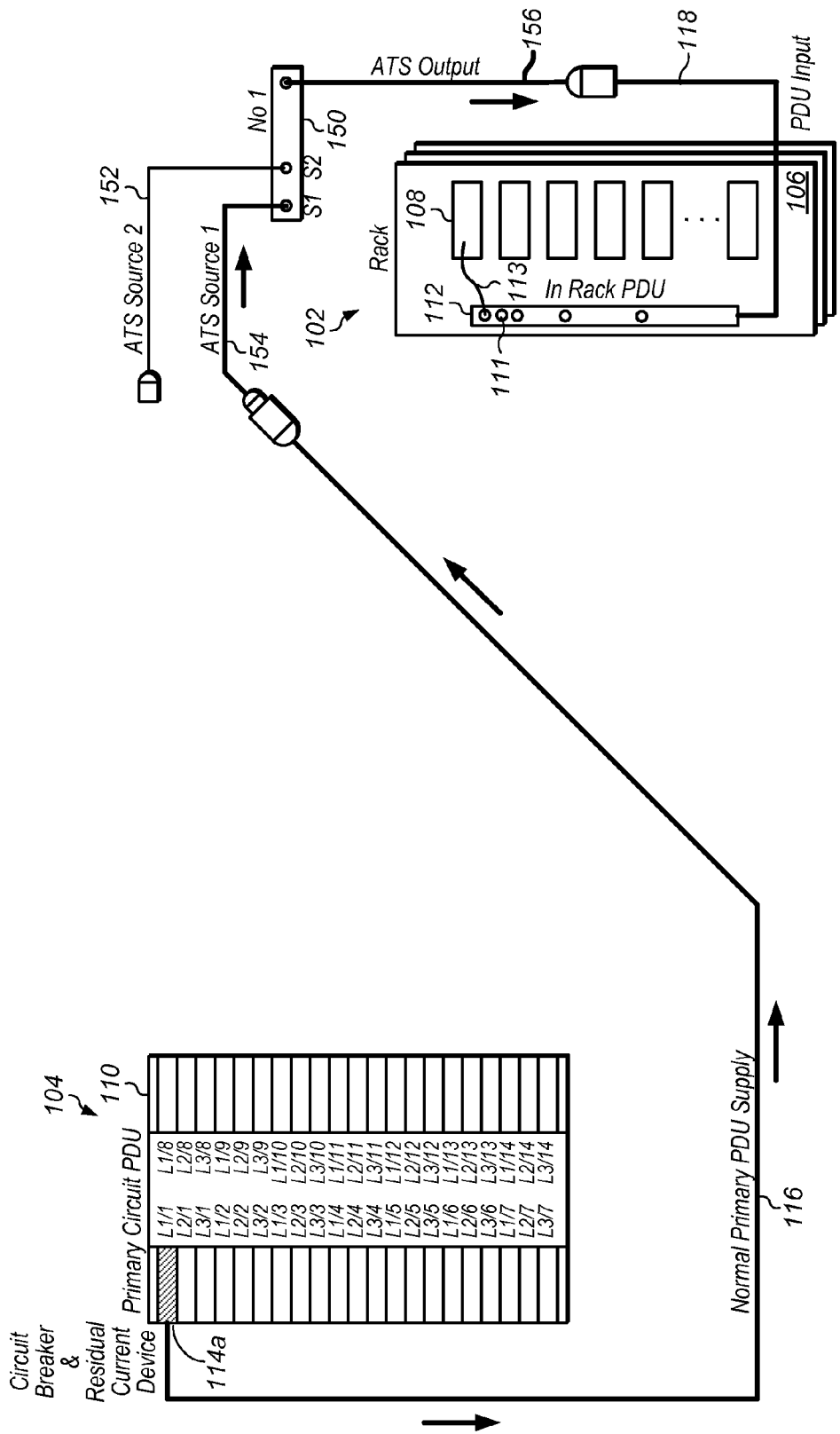
FIG. 7 illustrates electrical systems receiving power from primary power source through an automatic transfer switch.

Once the loads of the electrical systems have been transferred to the primary power source, the back-feed from the donor source may be removed. FIG. 7 illustrates electrical systems receiving power from a primary power source through an automatic transfer switch (with no source on the alternate source input). Electrical systems 108 receive power from floor power distribution unit 110 by way of primary power cable 116, automatic transfer switch 120, and rack power distribution unit 112.

Figure 8:
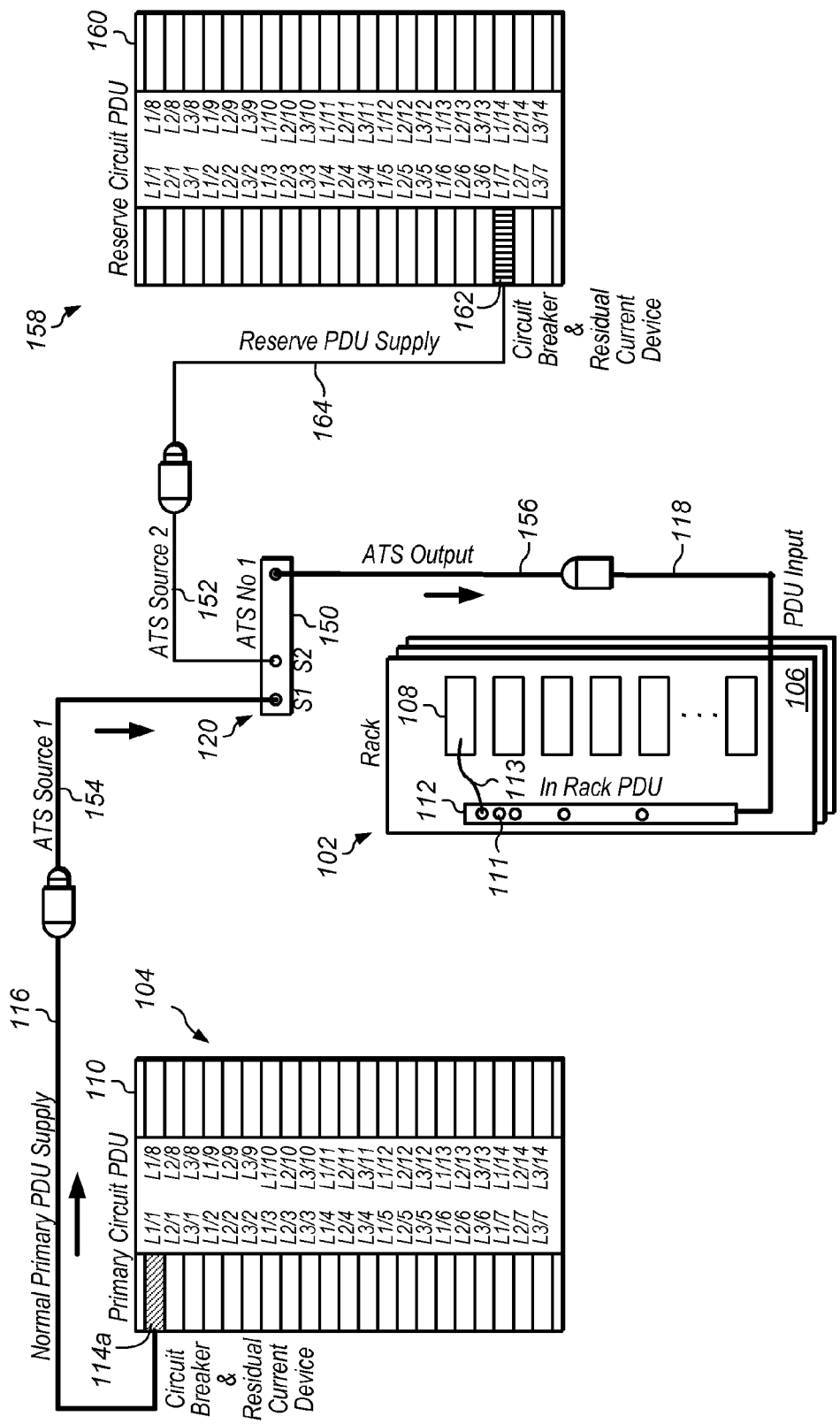
FIG. 8 illustrates a system that includes a reserve power source connected to an alternate source input of an automatic transfer switch.

With the primary power source continuing to supply power to the electrical system, a reserve power source may be connected the alternate source input of the ATS. FIG. 8 illustrates a system that includes a reserve power source connected to an alternate source input of an automatic transfer switch. Reserve power system 158 includes floor power distribution unit 160, power output device 162, and reserve power cable 164. Alternate source input cable 152 may be coupled to reserve power cable 164. Reserve floor power distribution unit 160 may provide reserve power to rack systems 102.

In some embodiments, reserve power system 158 provides reserve power for all of the electrical systems 108 supplied by primary power system 104. In some embodiments, reserve power system 158 is powered up at all times during operation of a data center. The reserve power system may be passive until a failure of one or more components of primary power system 104, at which time the reserve power system may become active.

In various embodiments, a secondary feed to a power distribution is supplied by tapping an element in a power chain that is upstream from a rack power distribution unit. As illustrated in the embodiments shown in FIGS. 1-8, for example, a back feed to rack power distribution unit 112 is supplied from floor power distribution unit 110. Floor power distribution unit 110 is upstream from, and supplies power to, rack power distribution unit 102. In another embodiment, a feed may be supplied from an uninterruptible power supply in the primary power system (such as UPS 109 of primary power system 104 shown in FIG. 1). A feed may, in various embodiments, be supplied from any power source, however. For example, in certain embodiments, a feed may be supplied from a floor power distribution unit in a data center other than the floor power distribution unit 110, from a reserve power system, or a source external to the data center.

Figure 9:
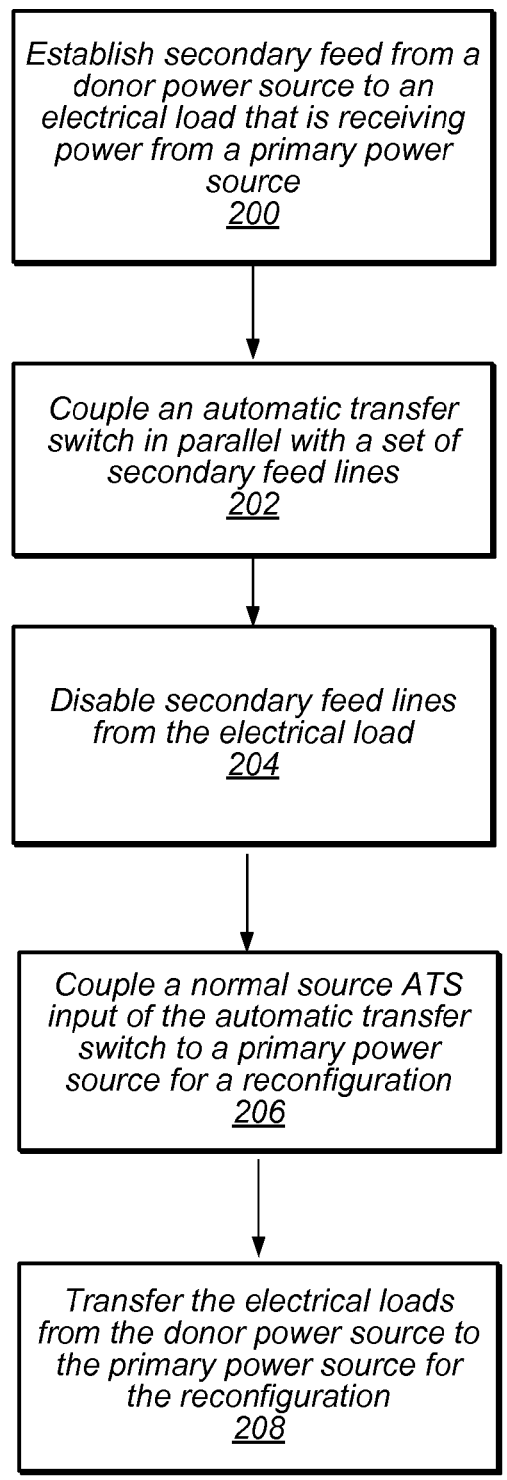
FIG. 9 illustrates reconfiguring a power system for an electrical load in a live setting using an automatic transfer switch.

FIG. 9 illustrates reconfiguring a power system for an electrical load in a live setting using an automatic transfer switch. In some embodiments, a reconfiguration process is used to cut in the ATS so a back-up power source can be added (the back-up power source may be provided on the alternate input of the ATS) as described above relative to FIGS. 1-8. In other embodiments, a reconfiguration process is used to migrate computing devices from one primary power source to another primary power source. For example, in one embodiment, the procedure described above may be modified such that rack systems 102 are coupled to a new primary power source (for example, a different floor power distribution unit than floor power distribution unit 110). In some embodiments, the primary power source for the reconfiguration is on the same phase as the primary power source before the reconfiguration. In other embodiments, the primary power source for the reconfiguration is on a different phase than the primary power source before the reconfiguration.

At 200, a secondary feed is established for an electrical load that is receiving power from a primary power source. Establishing the secondary feed may include connecting a set of secondary feed lines between a donor power source and a power input to the electrical load such that the set of secondary feed lines supplies power from the donor power source to the electrical load. In some embodiments, a back feed unit is used to switch on the back feed. In one embodiment, a 3-pole breaker is installed in a floor PDU to provide a back feed to a rack PDU. Enough cable may be left exposed on the load side of the breaker to be able to measure the current on each phase with a tong ammeter or a grip ammeter. Once installed, the 3-pole breaker may be shut.

At 202, an automatic transfer switch is coupled in parallel with the set of secondary feed lines. An alternate source ATS input of the automatic transfer switch may be connected to the donor power source. The ATS output of the automatic transfer switch may be connected to the power input of the electrical load. The electrical load may receive power from the donor power source via the automatic transfer switch.

At 204, the set of secondary feed lines is disabled from the electrical load. The secondary feed lines may be disabled by operating a switch, or by physically disconnecting cables of the back feed.

At 206, a normal source ATS input of the automatic transfer switch is coupled to a primary power source for the reconfiguration. In some embodiments, the primary power may be disabled when the normal source ATS input is connected (for example, a residual circuit device may be in a tripped state). In such cases, an operator may enable primary power (for example, reset the residual current device, or close a switch) after the cables have been connected.

At 208, the electrical load is transferred by the automatic transfer switch from the donor power source to the primary power source for the reconfiguration. The transfer may occur automatically based on a protocol that is implemented by the automatic transfer switch. In certain embodiments, a user may input switching criteria for the transfer to the automatic transfer switch. The criteria may be implemented by the automatic transfer switch to control switching over to the primary power source. For example, the user may specify stability criteria for power supply for the normal source input that must be met before switching from the alternate source input of the automatic transfer switch to the normal source input of the automatic transfer switch. In certain embodiments, switching from the alternate source to the normal source is controlled by a signal from a system external to the automatic transfer switch.

In certain embodiments, a reconfiguring a system includes assessing whether two power sources are matched with one another. For example, for each PDU, tests may be performed to establish the appropriate phase and whether a match exists before connecting the input lines to a back feed line for the PDU. In some embodiments, a maximum variation may be established for the potential. In one embodiment, the potentials allowed to differ by no more than of 7 VAC. In another embodiment, the potential is allowed to differ by no more than 5%. In some embodiments, phase integrity may be verified by two electricians.

As operations may be performed "hot", electrical safety precautions may be utilized, which may include ensuring that: (1) all electrical safety procedures are followed; (2) personal protective equipment is used; (3) proper change management/configuration management is in place, identifying the specific rack(s) being back-fed and notifying the proper personnel; and (4) the primary feed to the server rack (s) has no abnormal conditions that would jeopardize the rack during a secondary feed process. For example, power characteristics such as voltage deviation, frequency deviation, and phase deviation may be determined to be within acceptable ranges, for example, within plus or minus 5%. Throughout the process, multiple connectors may be energized since an additional power source is being introduced. Precautions may be taken that these connectors are carefully handled, and properly insulated.

Equipment for establishing a feed, such as backfeed system 120 described above relative to FIG. 1, may be staged in any suitable location. In one embodiment, the backfeed unit is positioned at the end of row to prevent interference with other server racks. In certain embodiments, test and/or feed equipment may be mounted on a cart.

Although in the examples described above, the secondary feed or backfeed was established by feeding into a power distribution unit, in certain embodiments, a secondary or tertiary feed may be established by feeding into other elements in a power distribution system. In certain embodiments, a secondary feed is established by backfeeding into a remote power panel.

Although in the examples described above, a secondary feed is made into a rack-level PDU, a secondary power feed may in various embodiments be supplied to any component in a system. In one embodiment, a backfeed is established into output receptacles of a floor PDU, such as floor power distribution unit 110 described above relative to FIG. 1. The power source may come from any source, such as different floor PDU, a UPS, or other system. A floor PDU back feed may be established, for example, to replace a circuit breaker in the floor PDU.

Figure 10:
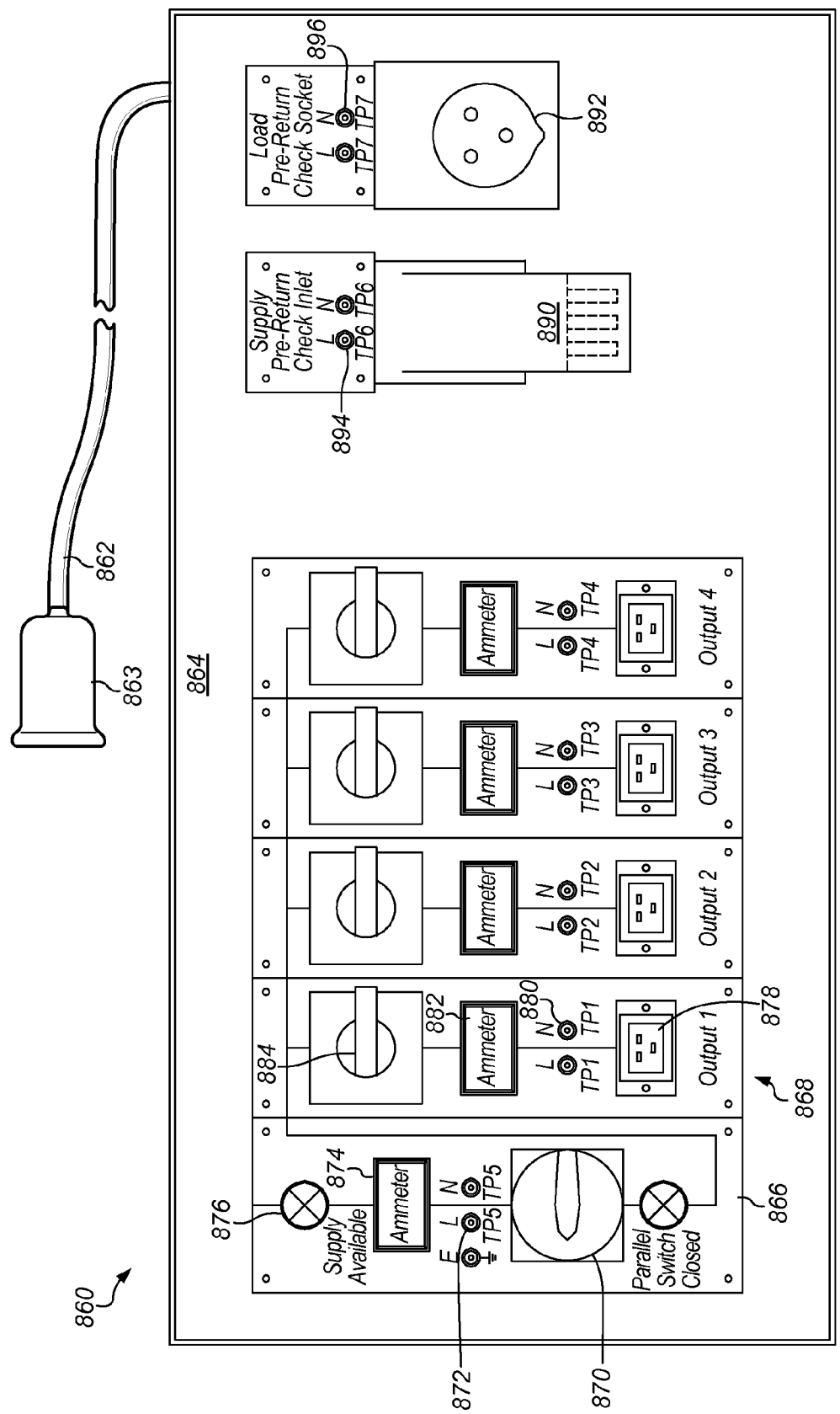
FIG. 10 illustrates a front panel view of one embodiment of a backfeed control unit.

FIG. 10 illustrates a front panel view of one embodiment of a backfeed control unit. A backfeed control unit may be used, for example, as a paralleling panel in the backfeed unit described above relative to FIGS. 1-8. Backfeed control unit 860 includes front panel 864 and input cable 862. Input cable 862 may couple with a power source, either directly or through an intermediate system such as a receptacle panel. Master control 866 and outputs 868 are provided on front panel 864. Master control 866 includes master switch 870, test points 872, ammeter 874, and indicator lamps 876. Each of outputs 868 includes output receptacle 878, test points 880, ammeter 882, and switch 884.

Input cable 862 includes plug 863. In one embodiment, plug 863 is a IEC 60309 2P+NE, 32 A plug. In another embodiment, plug 863 is a L6-30P plug.

Power may be routed from input cable 862 to each of outputs 868. Ammeter 874 may provide a visual indicator of a current level in input cable 862. Ammeters 882 may provide a visual indication of a current level in each of outputs 868. Switches 870 and 884 may be used to control power outputs 868.

Backfeed control unit 860 includes supply pre-return check inlet 890 and load pre-return check socket 892. Supply pre-return check inlet 890 includes test points 894. Load pre-return check socket 892 includes test points 896.

Figure 11:
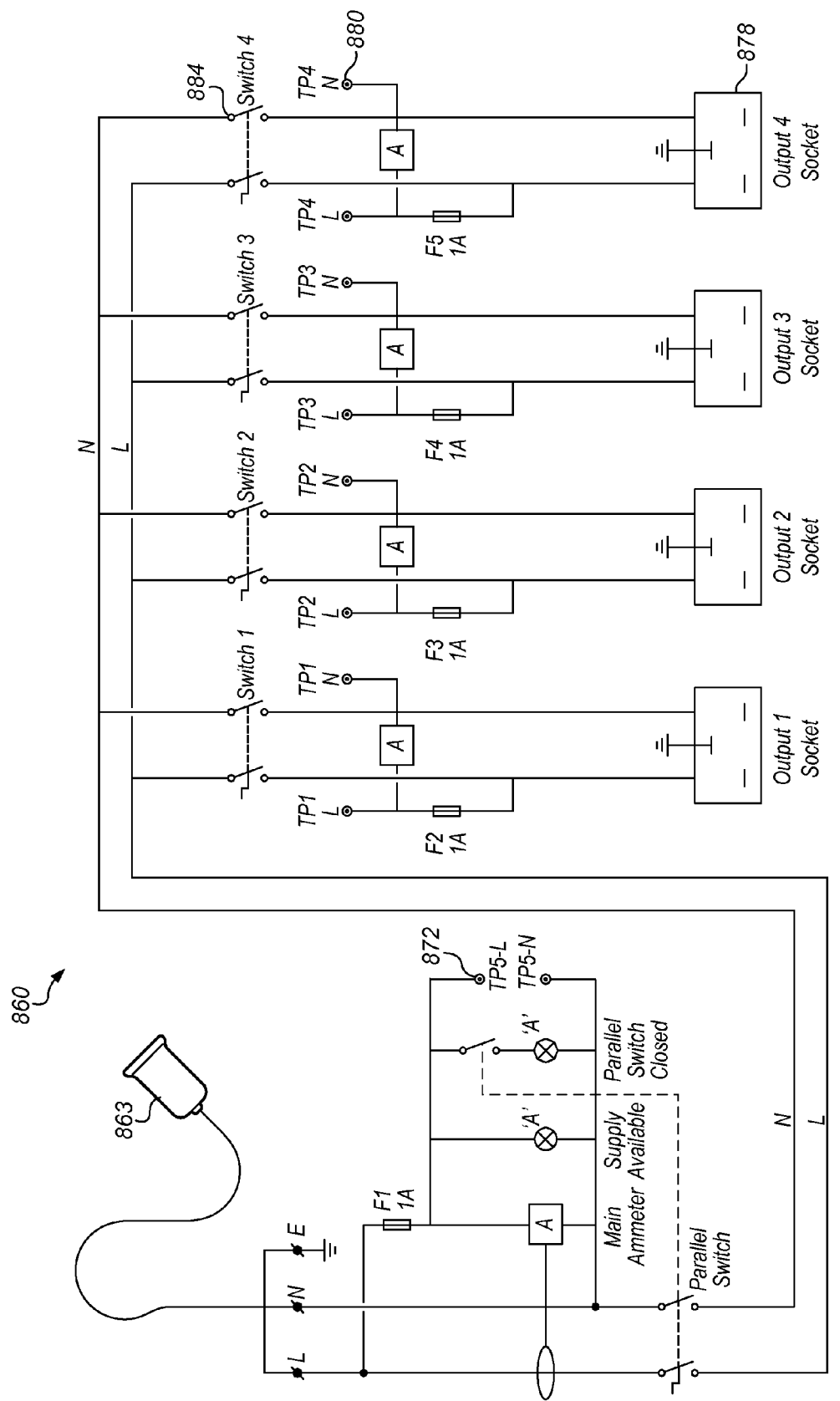
FIG. 11 is a schematic diagram illustrating input, master control, and output portions of a backfeed control unit according to one embodiment.

FIG. 11 is a schematic diagram illustrating the input cable 862, master control 866, and output 868 portions of backfeed control unit 860 according to one embodiment.

Figure 12:
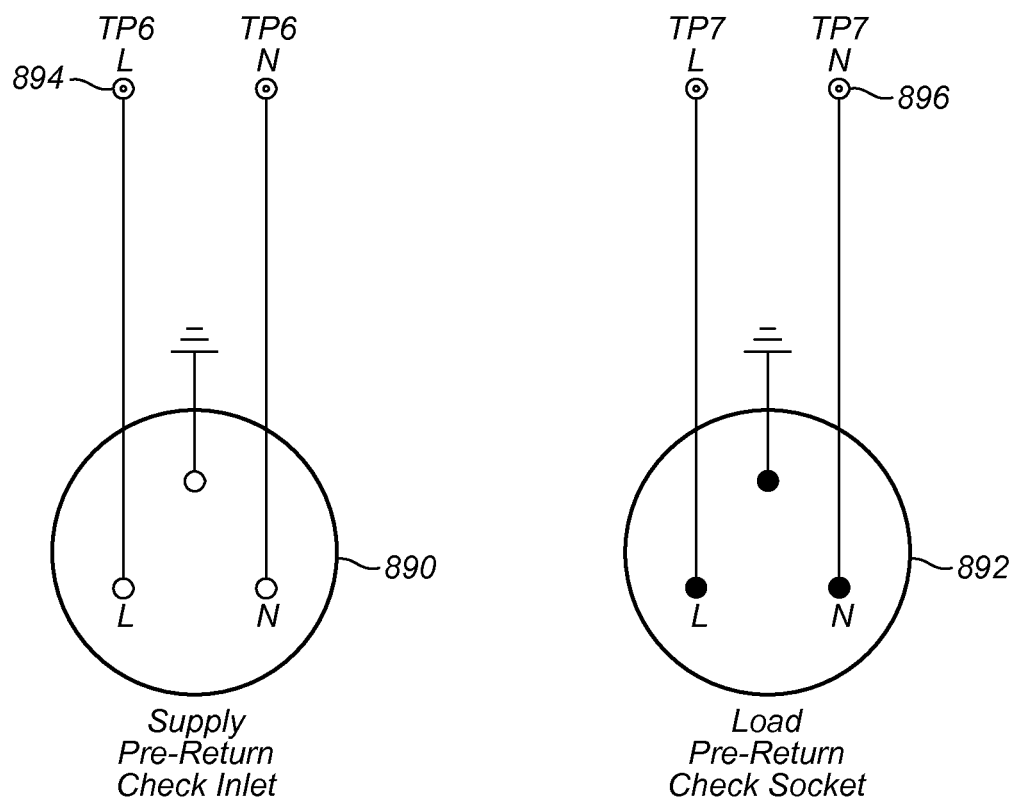
FIG. 12 is a schematic diagram illustrating supply pre-return check inlet and load pre-return check socket portions of a backfeed control unit according to one embodiment.

FIG. 12 is a schematic diagram illustrating the supply pre-return check inlet 890 and load pre-return check socket 892 portions of backfeed control unit 860 according to one embodiment. In one embodiment, supply pre-return check inlet 890 is a IEC 60309 2P+NE, 32 A male connector portion and load pre-return check socket 892 is a IEC 60309 2P+NE, 32 A receptacle.

In various embodiments described above, a feed system is wired to provide any combination of phases from a three-phase power source. A feed system may, however, provide other types of power (for example, two-phase, single phase). In one embodiment, a secondary feed system receives two-phase power from a power source and allows synchronization for any combination of phases of the two-phase power. In one embodiment, a secondary feed system receives single-phase power (for example, one hot and one neutral) from a power source and allows synchronization with any phase and neutral of a poly-phase system.

In some embodiments, a set of secondary feed lines (for example, back feed lines) and a set of input lines may be tested to determine a match between a pair of lines in the set of secondary feed lines and the set of input lines on a primary power system. Determining the match may include matching the phase of the pair of secondary feed lines with the phase of the pair of input lines. The pair of secondary feed lines may be coupled to the matching pair of input lines while primary power is maintained to the systems. In certain embodiments, a synchronization system is used to test lines of the feed cable and lines of an input cable to establish a match of phase and polarity between a pair of lines in the set of feed lines and a pair of lines in the set of input lines. U.S. patent Ser. No. 12/892,750_, "Method and System for Establishing a Power Feed to Systems During Operation", filed Sep. 28, 2010, which is incorporated by reference as if fully set forth herein, includes systems, devices, and techniques that may be used in various embodiments to establish power feeds and to maintain and reconfigure computing systems.

In various embodiments described above, a secondary feed is established for systems during operation of the systems. In certain embodiments, however, some or all of the systems in a data center may be taken out of operation during establishment of a secondary feed.

Although in some embodiments described herein, an additional feed is a secondary feed connected in parallel to a single primary feed, power feeds may, in various embodiments, be added to systems having any number of existing feeds. Thus, an additional power feed may be a secondary power feed, a tertiary power feed (for example, a feed to a system receiving power from two existing power systems), etc.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of reconfiguring a power system for computing devices in a rack, comprising:
    establishing a back-feed to computing devices in a rack computing system that is receiving power from a primary power source, wherein establishing the back-feed comprises coupling a set of back-feed lines from a donor power source to one or more output receptacles of a rack power distribution unit of the rack computing system such that the set of back-feed lines supplies power from the donor power source to the computing devices;
    coupling an automatic transfer switch in parallel with the set of back-feed lines, wherein an alternate source ATS input of the automatic transfer switch is coupled to the donor power source and wherein an ATS output of the automatic transfer switch is coupled to a power input of the computing devices such that the computing devices receive power from the donor power source via the automatic transfer switch;
    disabling the set of back-feed lines from the computing devices;
    coupling a normal ATS input of the automatic transfer switch to a primary power source for the reconfiguration; and
    transferring, by the automatic transfer switch, the computing devices from the donor power source to the primary power source for the reconfiguration.

2. The method of claim 1, wherein the transfer is performed by the automatic transfer switch in response to supplying power to the normal source ATS input of the automatic transfer switch.

3. The method of claim 1, further comprising:
    disconnecting the donor power source from the alternate source ATS input of the automatic transfer switch; and
    connecting another power source to the alternate source ATS input of the automatic transfer switch.

4. The method of claim 1, wherein the primary power source includes a residual current device configured to trip as a result of an imbalance between lines connected to a power output device of the primary power source, wherein the residual current device trips when the back-feed is established.

5. The method of claim 1, wherein the primary power source for the reconfiguration is a different power source from the power source that was supplying power when the back-feed was established.

6. A method of reconfiguring a power system for an electrical load, comprising:
   establishing a secondary feed to an electrical load that is receiving power from a primary power source, wherein establishing the secondary feed comprises coupling a set of secondary feed lines between a donor power source and a power input to the electrical load such that the set of secondary feed lines is configured to supply power from the donor power source to the electrical load;
   coupling an automatic transfer switch in parallel with the set of secondary feed lines, wherein an alternate source ATS input of the automatic transfer switch is coupled to the donor power source and wherein an ATS output of the automatic transfer switch is coupled to the power input of the electrical load such that the electrical load receives power from the donor power source via the automatic transfer switch;
   disabling the set of secondary feed lines from the electrical load;
   coupling a normal source ATS input of the automatic transfer switch to a primary power source for the reconfiguration; and
   transferring, by the automatic transfer switch, the electrical load from the donor power source to the primary power source for the reconfiguration.

7. The method of claim 6, wherein the transfer is performed by the automatic transfer switch in response to supplying power to the normal source ATS input of the automatic transfer switch.

8. The method of claim 6, further comprising:
   disconnecting the donor power source from the alternate source ATS input of the automatic transfer switch; and
   connecting another power source to the alternate source ATS input of the automatic transfer switch.

9. The method of claim 6, wherein the primary power source for the reconfiguration is the same power source that was supplying power when the secondary feed was established.

10. The method of claim 6, wherein the primary power source includes a residual current device configured to trip as a result of an imbalance between lines connected to a power output device of the primary power source, wherein the residual current device trips when the secondary feed is established.

11. The method of claim 10, wherein coupling the normal input of the automatic transfer switch to the primary power source for the reconfiguration comprises resetting the residual current device in the primary power source.

12. The method of claim 6, wherein the primary power source for the reconfiguration is a different power source from the power source that was supplying power when the secondary feed was established.

13. The method of claim 6, wherein the secondary feed lines are back-fed to a rack power distribution unit.

14. The method of claim 6, wherein coupling the ATS output to the power input comprising connecting the ATS output to an input cable of a rack power distribution unit.

15. The method of claim 6, wherein the secondary feed lines pass through a back-feed unit, wherein establishing the secondary feed comprises operating one or more switches in the back-feed unit to connect the electrical loads to the donor power source.

16. The method of claim 6, wherein the donor power source and the primary power source are from the same floor power distribution unit.

17. The method of claim 6, wherein:
   the primary power source includes a residual current device configured to trip as a result of an imbalance between lines connected to a power output device of the primary power source, wherein the residual current device trips when the secondary feed is established; and
   wherein the donor power source does not include a residual current device.

18. The method of claim 6, wherein the electrical load comprises one or more rack-mounted computing devices.

* * * * *